(12) United States Patent
Clarke

(10) Patent No.: US 7,721,945 B2
(45) Date of Patent: May 25, 2010

(54) METHOD AND SYSTEM OF PRE-LOADING PREFERRED ACCESS CONTACT INFORMATION IN MEMORY

(75) Inventor: Wayne A. Clarke, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 428 days.

(21) Appl. No.: 11/427,658

(22) Filed: Jun. 29, 2006

(65) Prior Publication Data

US 2008/0000958 A1 Jan. 3, 2008

(51) Int. Cl.
*G06F 17/00* (2006.01)
(52) U.S. Cl. .................. 235/375; 235/382; 235/378
(58) Field of Classification Search .............. 235/375, 235/382, 378, 487; 705/52–53, 77, 79, 26, 705/42
See application file for complete search history.

(56) References Cited

U.S. PATENT DOCUMENTS

| | | | |
|---|---|---|---|
| 7,305,702 B2 * | 12/2007 | Bell et al. ................ 726/5 |
| 2003/0149662 A1 * | 8/2003 | Shore ................... 705/39 |
| 2004/0149121 A1 * | 8/2004 | Ballard ................. 84/615 |
| 2005/0080682 A1 * | 4/2005 | Wilson ................. 705/26 |
| 2007/0026371 A1 * | 2/2007 | Wood .................. 434/317 |
| 2007/0099636 A1 * | 5/2007 | Roth ................... 455/466 |

OTHER PUBLICATIONS

Sprint Nextel, "Get the 411 on Sprint's Concierge Service", Concierge in Your Phone, Sprint 411; 2 pages article published on http://www.nextel.com/en/services/calling/nextel411.shtml, website last visited Jun. 29, 2006.

* cited by examiner

*Primary Examiner*—Edwyn Labaze
(74) *Attorney, Agent, or Firm*—Pablo Meles; Akerman Senterfitt

(57) ABSTRACT

A method (300) and system for pre-loading preferred access contact information can include a transceiver (28), memory (24) for pre-storing preferred access contact information for a predetermined merchant in an electronic phonebook or a speed dial number slot, a presentation device (26) and a processor (22) coupled to the transceiver and memory of a portable communication device (20). The processor can be programmed to track accesses to the preferred access contact information from the memory and report the number of accesses to a server accessible by the transceiver. The processor can be programmed to automatically present an advertisement stored in memory to a user when the user accesses the preferred access contact information. Note, the manufacturer of the portable communication device 20 can charge a fee to the predetermined merchant for pre-storing the preferred access contact information in the electronic address book or in a speed dial storage slot.

20 Claims, 3 Drawing Sheets

300

┌─────────────────────────────────────────────────────────────────────┐
│ STORE PREFERRED ACCESS CONTACT INFO FOR A PREDETERMINED             │
│ MERCHANT AS AUTHORIZED BY MERCHANT INTO ADDRESS BOOK  302           │
└─────────────────────────────────────────────────────────────────────┘
                                    ↓
┌─────────────────────────────────────────────────────────────────────┐
│       PRE-STORE THE PREFERRED ACCESS CONTACT INFO        304        │
│    BEFORE A USER PURCHASES THE PORTABLE COMMUNICATION DEVICE        │
└─────────────────────────────────────────────────────────────────────┘
                                    ↓
┌─────────────────────────────────────────────────────────────────────┐
│     STORE THE PREFERRED ACCESS CONTACT INFO IN A MEMORY    306      │
│           INACCESSIBLE FOR MODIFICATION BY A USER, BUT              │
│    MODIFIABLE BY AN AUTHORIZED MANUFACTURER, CARRIER, OR            │
│    MERCHANT EITHER BEFORE A USER PURCHASES THE PORTABLE             │
│    COMM. DEVICE OR AFTER THE USER PURCHASES THE PORTABLE            │
│    COMM. DEVICE USING OVER THE AIR PROGRAMMING OF THE MEMORY        │
└─────────────────────────────────────────────────────────────────────┘
                                    ↓
┌─────────────────────────────────────────────────────────────────────┐
│  RECEIVE A FEE FROM THE PREDETERMINED MERCHANT FOR STORING          │
│   THE PREFERRED ACCESS CONTACT INFO IN THE ADDRESS BOOK  308        │
└─────────────────────────────────────────────────────────────────────┘
                                    ↓
┌─────────────────────────────────────────────────────────────────────┐
│  STORE ADVERTISING CONTENT (VIDEO COMMERCIALS, SCREEN SAVERS,       │
│  OR WALL PAPERS) USED ON A DISPLAY OF THE PORTABLE COMM DEVICE      │
│        ASSOCIATED WITH THE PREDETERMINED MERCHANT       310         │
└─────────────────────────────────────────────────────────────────────┘
                                    ↓
┌─────────────────────────────────────────────────────────────────────┐
│    RECEIVE A FEE FROM THE PREDETERMINED MERCHANT EACH TIME          │
│    A USER ACCESSES THE ADVERTISING CONTENT ASSOCIATED               │
│               WITH THE PREDETERMINED MERCHANT.          312         │
└─────────────────────────────────────────────────────────────────────┘
                                    ↓
┌─────────────────────────────────────────────────────────────────────┐
│   RECEIVE A FEE FROM THE PREDETERMINED MERCHANT EACH TIME A         │
│   USER COMPLETES COMMUNICATION WITH THE MERCHANT USING THE          │
│         PREFERRED ACCESS CONTACT INFORMATION            314         │
└─────────────────────────────────────────────────────────────────────┘
                                    ↓
┌─────────────────────────────────────────────────────────────────────┐
│    AUTOMATICALLY PRESENT THE ADVERTISING CONTENT ASSOCIATED         │
│       WITH THE PREDETERMINED MERCHANT EACH TIME A USER              │
│      ACCESSES THE PREFERRED ACCESS CONTACT INFORMATION.   316       │
└─────────────────────────────────────────────────────────────────────┘
                                    ↓
┌─────────────────────────────────────────────────────────────────────┐
│      STORE PREFERRED ACCESS CONTACT INFORMATION FOR THE    318      │
│   PREDETERMINED MERCHANT AS A PRELOADED SPEED DIAL NUMBER.          │
└─────────────────────────────────────────────────────────────────────┘

FIG. 3

METHOD AND SYSTEM OF PRE-LOADING PREFERRED ACCESS CONTACT INFORMATION IN MEMORY

FIELD

This invention relates generally to address books and preferred contact information, and more particularly to a system and method for pre-loading contact information in an electronic address book.

BACKGROUND

Consumers generally don't want to waste time being placed on hold when calling a call center for services, particularly a service they use regularly. Many companies such as car rental companies, airlines companies, travel agents, and credit card companies have special VIP 800 phone numbers that are given to preferred clients that prevents them or reduces the chances from being placed on hold for an extended period of time. These business service providers are constantly looking for advertising channels that gives them access to these preferred business customers and further ways to develop brand loyalty.

SUMMARY

Embodiments in accordance with the present invention can provide service companies or other entities, particularly existing business service suppliers that provide travel, car rental, and credit card services with advertising leverage by allowing these service companies to preload their preferred contact numbers onto cellular handsets and pay manufacturers of such handsets an advertising fee for each number that is preloaded in the handset or a fee for each access to such pre-loaded number. Thus, these service companies or other entities or vendors offering products or services can be considered merchants within contemplation of the embodiments herein.

In a first embodiment of the present invention, a method of pre-loading preferred access contact information in an electronic address book or speed dial memory of a portable communication device can include storing preferred access contact information for a predetermined merchant as authorized by the predetermined merchant into the electronic address book or speed dial memory and receiving a fee from the predetermined merchant for storing the preferred access contact information in the electronic address book or speed dial memory. The preferred access contact information can be any contact number or address or other communication link that enables a user to contact a particular merchant in a preferential manner. Storing can involve pre-storing the preferred access contact information before a user purchases the portable communication device or storing the preferred access contact information in a memory inaccessible for modification by a user, but modifiable by an authorized manufacturer, carrier, or merchant either before a user purchases the portable communication device or after the user purchases the portable communication device using over the air programming of the memory. The method can further include storing advertising content associated with the predetermined merchant and further receiving a fee from the predetermined merchant when a user accesses the advertising content associated with the predetermined merchant. The method can also include automatically presenting the advertising content associated with the predetermined merchant when a user accesses the preferred access contact information. The advertising content can be in the form of video commercials, screen savers, or wall papers used on a display of the portable communication device. In another alternative, a fee can be received from the predetermined merchant when a user completes communication with the merchant using the preferred access contact information. The step of storing can also involve storing preferred access contact information for the predetermined merchant as a preloaded speed dial number. Note, in a similar embodiment, a method of providing a portable radio communication device that includes preloaded preferred access contact information in an electronic address book or speed dial memory of the portable communication device can include the steps of storing preferred access contact information for a predetermined merchant as authorized by the predetermined merchant into the electronic address book or speed dial memory and charging a fee to the predetermined merchant for storing the preferred access contact information in the electronic address book or speed dial memory.

In a second embodiment of the present invention, a portable communication device can include a transceiver, a display, a memory for an electronic phone book or speed dial numbers, and a processor coupled to the transceiver, display, and memory. The processor can be programmed to enable pre-loading of preferred access contact information for a predetermined merchant as authorized by the predetermined merchant into the memory for a predetermined fee. The processor can also be programmed to track the access by a user to the preferred access contact information. Note, the manufacturer of the portable communication device can charge a fee to the predetermined merchant for storing the preferred access contact information in the electronic address book or in a speed dial storage slot. The memory containing preferred access contact information can be inaccessible for modification by a user, but can be modifiable by an authorized manufacturer, carrier, or merchant either before the user purchases the portable communication device or after the user purchases the portable communication device using over the air programming of the memory. The processor can be further programmed to store advertising content associated for the predetermined merchant and can also be programmed to track when a user accesses the advertising content to enable a fee to be calculated and paid by the predetermined merchant when the user accesses the advertising content associated with the predetermined merchant. The processor can also be programmed to automatically present the advertising content associated with the predetermined merchant when a user accesses the preferred access contact information. The advertising content can be in the form of video commercials, screen savers, or wall papers used on a display of the portable communication device. The processor can also be programmed to track when a user completes communication with the merchant using the preferred access contact information to enable the calculation of a fee from the predetermined merchant for each access or communication.

In a third embodiment of the present invention, a portable wireless communication system can include a transceiver, memory for pre-storing preferred access contact information for a predetermined merchant in an electronic phonebook or a speed dial number slot authorized by the predetermined merchant, and a processor coupled to the transceiver and memory. The processor can be programmed to track accesses to the preferred access contact information from the memory and report the number of accesses to a server accessible by the transceiver. The processor can be further programmed to automatically present an advertisement stored in memory to a user when the user accesses the preferred access contact information.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The "processor" as described herein can be any suitable component or combination of components, including any suitable hardware or software, that are capable of executing the processes described in relation to the inventive arrangements.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 3 is a flow chart illustrating a method of pre-loading preferred access contact information in accordance with an embodiment of the present invention.

DETAILED DESCRIPTION OF THE DRAWINGS

Figure 1:
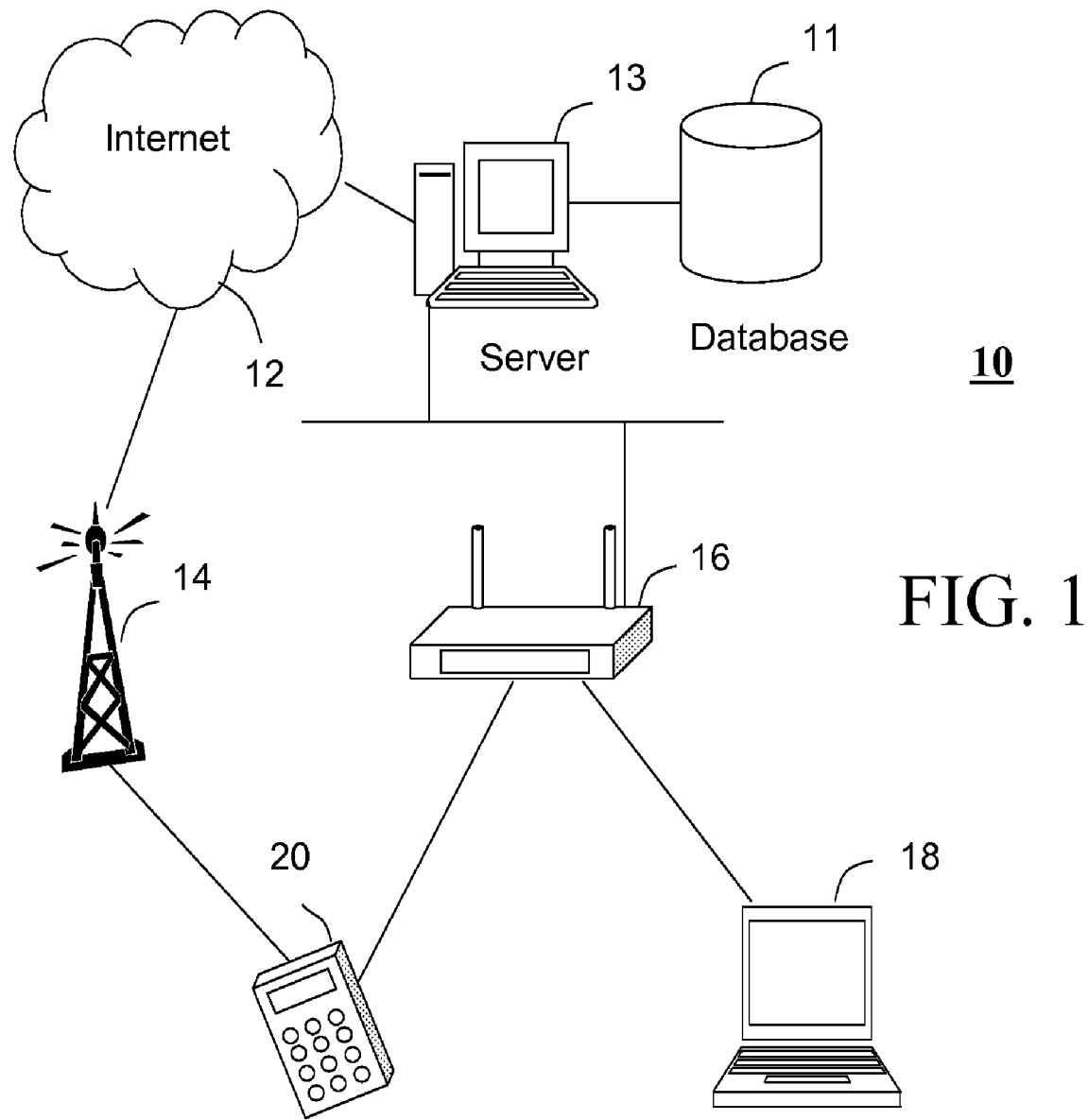
FIG. 1 is an illustration of a system pre-loading preferred access contact information in an electronic address book or speed dial memory of a portable communication device in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of exemplary ways that would enable business customers to spend less time on hold when calling for service from one of the business service companies that have their contact information pre-stored in a device memory. A carrier can advertise this feature and differentiate their product and service over other competing products and services. Business service companies can enjoy targeted advertising opportunities enabled by preloading their preferred access contact information or "VIP" phone number. In addition, advertising or commercials can be stored and played or presented on the portable communication device in various ways including video commercials, screen savers, wall papers or audio clips or any combination thereof. Such advertising can be formatted to operate efficiently on a portable electronic device with limited memory and battery power and can run as a traditional television commercial or a subtle wallpaper or screensaver or animated caller identifier (outgoing or incoming).

Referring to FIG. 1, a portable wireless communication system or device 20 can be part of a larger communication system 10 such as a cellular communication system or wireless local or wide area network communication system. The communication system 10 can include a plurality of communication base stations 14 and possibly other infrastructure that can be linked to the Internet 12 as well as a server 13 and database 11 that can contain advertising information, preferred contact information or other information as can be contemplated herein. The communication system 10 can also include one or more access points or wireless hubs 16 enabling the portable communication device 20 to communicate with the server 13 and database 11 or the Internet 12 or other devices 18 using an alternative communication path.

Figure 2:
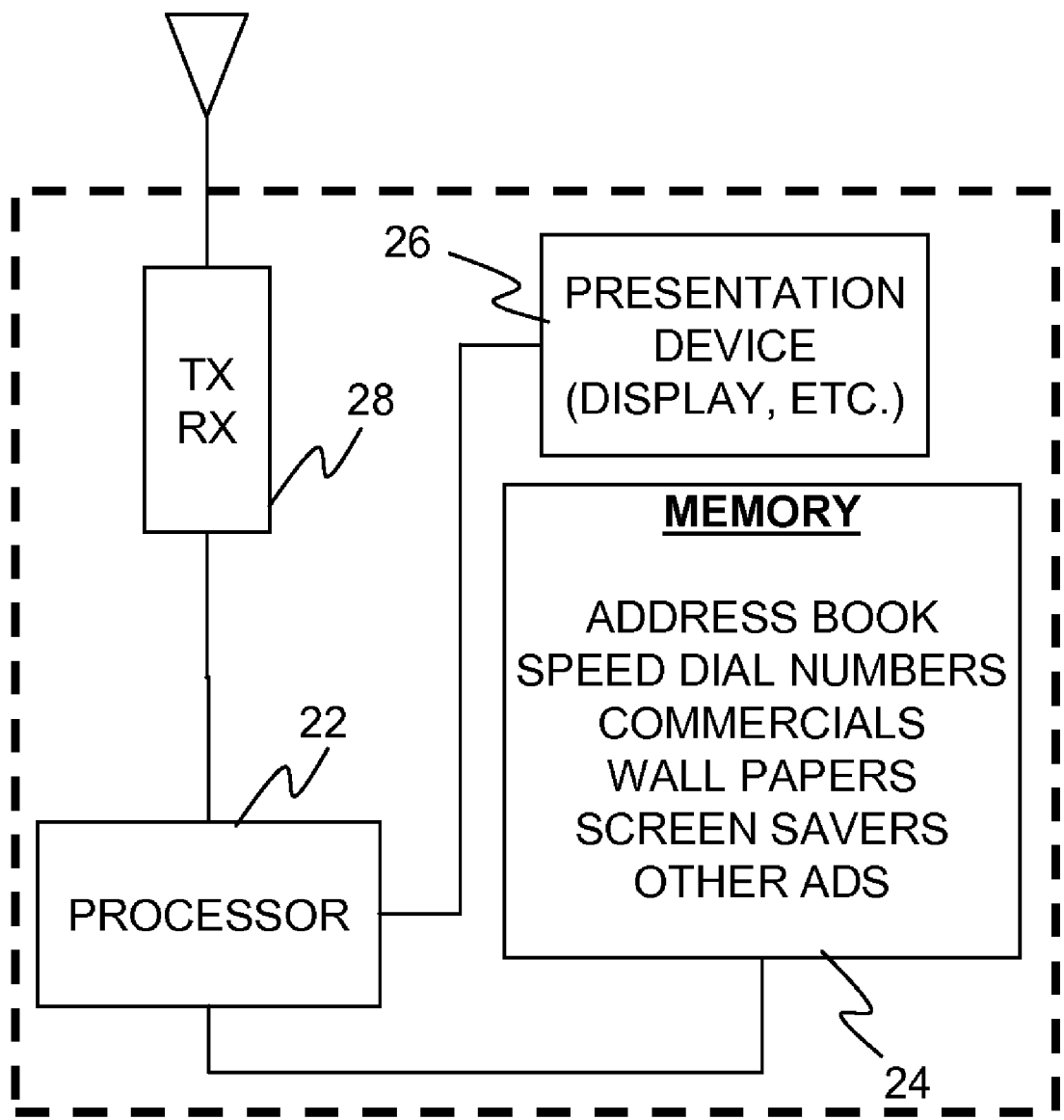
FIG. 2 is an illustration of portable communication device having pre-loaded preferred access contact information stored in memory in accordance with another embodiment of the present invention.

Referring to FIG. 2, the portable communication device 20 can include a transceiver 28, memory 24 for pre-storing preferred access contact information for a predetermined merchant in an electronic phonebook or a speed dial number slot authorized by the predetermined merchant, a presentation device 26 (such as a display or speaker or both) and a processor 22 coupled to the transceiver 28 and memory 24. The processor 22 can be programmed to track accesses to the preferred access contact information from the memory and report the number of accesses to a server accessible by the transceiver such as server 13 of FIG. 1. The processor 22 can be further programmed to automatically present an advertisement stored in memory to a user when the user accesses the preferred access contact information.

Note, the manufacturer of the portable communication device 20 can charge a fee to the predetermined merchant for storing the preferred access contact information in the electronic address book or in a speed dial storage slot. The memory 24 containing preferred access contact information can be inaccessible for modification by a user, but can be modifiable by an authorized manufacturer, carrier, or merchant either before the user purchases the portable communication device 10 or after the user purchases the portable communication device 10 using over the air programming of the memory. The processor 22 can be further programmed to store advertising content associated for the predetermined merchant and can also be programmed to track when a user accesses the advertising content to enable to calculate a fee to be paid by the predetermined merchant when the user accesses the advertising content associated with the predetermined merchant. The processor 22 can also be programmed to automatically present the advertising content associated with the predetermined merchant when a user accesses the preferred access contact information. The advertising content can be in the form of video commercials, screen savers, or wall papers used on a display of the portable communication device. The processor can also be programmed to track when a user completes communication with the merchant using the preferred access contact information to enable the calculation of a fee from the predetermined merchant for each access or communication.

Referring to FIG. 3, a flow chart illustrating a method 300 of pre-loading preferred access contact information in an electronic address book or speed dial memory of a portable communication device is shown. The method 300 can include storing preferred access contact information for a predetermined merchant as authorized by the predetermined merchant into the electronic address book or speed dial memory at step 302 and receiving a fee from the predetermined merchant for storing the preferred access contact information in the electronic address book or speed dial memory at step 308. Storing can involve pre-storing the preferred access contact information before a user purchases the portable communication device at step 304 or storing at step 306 the preferred access contact information in a memory inaccessible for modification by a user, but modifiable by an authorized manufacturer, carrier, or merchant either before a user purchases the portable communication device or after the user purchases the portable communication device using over the air programming of the memory. The method 300 can further include the step 310 of storing advertising content associated with the predetermined merchant and further receiving a fee from the predetermined merchant when a user accesses the advertising content associated with the predetermined merchant at step 312. In another alternative, a fee can be received from the predetermined merchant when a user completes communication with the merchant using the preferred access contact information at step 314. The method 300 can also include automatically presenting the advertising content associated with the predetermined merchant when a user accesses the preferred access contact information at step 316. The advertising content can be in the form of video commercials, screen savers, or wall papers used on a display of the portable communication device. The step of storing can also involve the step 318 of storing preferred access contact information for the predetermined merchant as a preloaded speed dial number.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of pre-loading preferred access contact information in an electronic address book or speed dial memory of a portable communication device, comprising:

storing preferred access contact information for a predetermined merchant as authorized by the predetermined merchant into the electronic address book or speed dial memory of the portable communication device;

storing in a memory advertising content associated with the predetermined merchant; and receiving a fee from the predetermined merchant for storing the preferred access contact information in the electronic address book or speed dial memory of the portable communication device and when a user visually accesses the advertising content from memory associated with the predetermined merchant.

2. The method of claim 1, wherein the step of storing comprises pre-storing the preferred access contact information into the electronic address book or speed dial memory of the portable electronic device before a user purchases the portable communication device.

3. The method of claim 1, where the step of storing comprises storing the preferred access contact information in a memory inaccessible for modification by a user, but modifiable by an authorized manufacturer, carrier, or merchant either before a user purchases the portable communication device or after the user purchases the portable communication device using over the air programming of the memory.

4. The method of claim 1, wherein the method further comprises storing advertising content associated with the predetermined merchant.

5. The method of claim 1, wherein the method further comprises receiving a fee from the predetermined merchant when a user accesses the advertising content associated with the predetermined merchant.

6. The method of claim 1, wherein the method further comprises the step of automatically presenting the advertising content associated with the predetermined merchant when a user accesses the preferred access contact information.

7. The method of claim 1, wherein the advertising content is in the form of video commercials, screen savers, or wall papers used on a display of the portable communication device.

8. The method of claim 1, wherein the method further comprises receiving a fee from the predetermined merchant when a user completes radio frequency communication with the merchant using the preferred access contact information.

9. The method of claim 1, wherein the step of storing preferred access contact information for the predetermined merchant is done as a preloaded speed dial number.

10. A portable communication device, comprising:

a transceiver;

a display;

a memory for an electronic phone book or speed dial numbers of the portable communication device; and a processor coupled to the transceiver, display, and memory, wherein the processor is programmed to:

pre-load of preferred access contact information for a predetermined merchant as authorized by the predetermined merchant into the memory for a predetermined fee; and track when a user accesses advertising content from the memory to enable to calculate a fee to be paid by the predetermined merchant when the user accesses the advertising content associated with the predetermined merchant.

11. The portable communication device of claim 10, wherein the processor is further programmed to track the access by a user to the preferred access contact information.

12. The portable communication device of claim 10, wherein a manufacturer of the portable communication device charges a fee to the predetermined merchant for storing the preferred access contact information in the electronic address book or a speed dial storage slot.

13. The portable communication device of claim 10, the memory containing preferred access contact information is inaccessible for modification by a user, but is modifiable by an authorized manufacturer, carrier, or merchant either before the user purchases the portable communication device or after the user purchases the portable communication device using over the air programming of the memory.

14. The portable communication device of claim 12, wherein the processor is programmed to track when a user accesses the advertising content to enable to calculate a fee to be paid by the predetermined merchant when the user accesses the advertising content associated with the predetermined merchant.

15. The portable communication device of claim 12, wherein the processor is programmed to automatically present the advertising content associated with the predetermined merchant when a user accesses the preferred access contact information.

16. The portable communication device of claim 12, wherein the advertising content is in the form of video commercials, screen savers, or wall papers used on a display of the portable communication device.

17. The portable communication device of claim 10, wherein the processor is further programmed to track when a user completes communication with the merchant using the preferred access contact information to enable the calculation of a fee from the predetermined merchant for each access or communication.

18. A portable wireless communication system, comprising:
   a transceiver;
   memory of a portable communication device for pre-storing preferred access contact information for a predetermined merchant in an electronic phonebook or a speed dial number slot authorized by the predetermined merchant; and
   a processor coupled to the transceiver and memory, wherein the processor is programmed to:
      track accesses to the preferred access contact information from the memory of the portable communication device;
      report the number of accesses to a server accessible by the transceiver; and
      calculate a fee to be paid by the predetermined merchant based on the number of accesses to the preferred access contact information.

19. The portable wireless communication system of claim 18, wherein the processor is further programmed to automatically present an advertisement stored in memory to a user when the user accesses the preferred access contact information.

20. A method of providing a portable radio communication device that includes pre-loaded preferred access contact information in an electronic address book or speed dial memory of the portable communication device, comprising:
   storing preferred access contact information for a predetermined merchant as authorized by the predetermined merchant into the electronic address book or speed dial memory of the portable radio communication device;
   storing in a memory advertising content associated with the predetermined merchant; and
   charging a fee to the predetermined merchant for storing the preferred access contact information in the electronic address book or speed dial memory and when a user visually accesses the advertising content from memory associated with the predetermined merchant.

* * * * *